United States Patent
Cai et al.

(10) Patent No.: US 8,903,814 B2
(45) Date of Patent: Dec. 2, 2014

(54) INDEXING TIMESTAMP WITH TIME ZONE VALUE

(75) Inventors: Mengchu Cai, San Jose, CA (US); Yao Ching Stephen Chen, Saratoga, CA (US); Ruiping Li, Cupertino, CA (US); Wei Li, San Jose, CA (US); Robert William Lyle, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 13/177,606

(22) Filed: Jul. 7, 2011

(65) Prior Publication Data
US 2013/0013617 A1    Jan. 10, 2013

(51) Int. Cl.
*G06F 7/00* (2006.01)
*G06F 17/30* (2006.01)

(52) U.S. Cl.
CPC ............................... *G06F 17/30336* (2013.01)
USPC .......................................... 707/725; 707/746

(58) Field of Classification Search
USPC .......................................... 707/746, 725, 759
See application file for complete search history.

(56) References Cited

U.S. PATENT DOCUMENTS

| | | | |
|---|---|---|---|
| 7,275,105 B2 * | 9/2007 | Bloch et al. | 709/227 |
| 2003/0135495 A1 * | 7/2003 | Vagnozzi | 707/3 |
| 2005/0065906 A1 * | 3/2005 | Romero | 707/1 |
| 2008/0183737 A1 | 7/2008 | Bhalotia et al. | |
| 2008/0195583 A1 | 8/2008 | Hsu et al. | |
| 2009/0287662 A1 | 11/2009 | Robson et al. | |
| 2010/0145918 A1 | 6/2010 | Stata et al. | |

OTHER PUBLICATIONS

Bruni et al. "DB2 10 for z/OS Technical Overview" Dec. 30, 2010. IBM Redbooks. pp. 3-13, 166-184, 472-473.*
Mullins "DB2 Developer's Guide" May 11, 2004. Sams. pp. 233-251.*
Boniface, Andrew. "Indexing Schemes for Temporal Financial Information, using Java". Sep. 2002 [retrieved on Jan. 4, 2013]. Retrieved from the Internet:<URL: http://mcs-notes2.open.ac.uk:443/MScDiss.nsf/0/6A90D74B5C9F34BA8025704B00516CEB/$File/Boniface%202002.pdf?OpenElement>.*
Butcher, Tony. "Sams Teach yourself MySQL in 21 Days" [online]. 2nd Edition. Sams Dec. 17, 2002 [retrieved on Oct. 23, 2010]. Retrieved from the Internet:< URL: http://proquest.safaribooksonline.com/0-672-32392-3> pp. 110-124.*
Shi, Qingmin et al., Techniques for Indexing and Querying Temporal Observations for a Collection of Objects, Technical Reports from UMIACS, Aug. 1, 2003, pp. 1-21, College Park, MD, United States.
Oracle, 4 Datetime Datatypes and Time Zone Support, Oracle Database Globalization Support Guide, 1996, <http://download.oracle.com/docs/cd/B19306_01/server.102/b14225/ch4datetime.htm>.
Hasler, Tony, Tony's Tirade against Timestamp With Time Zone, Tony's Oracle Tips, Sep. 4, 2010, <http://tonyhasler.wordpress.com/2010/09/04/tonys-tirade-against-timestamp-with-time-zone/>.

* cited by examiner

*Primary Examiner* — James E Richardson
(74) *Attorney, Agent, or Firm* — Patterson & Sheridan, LLP

(57) ABSTRACT

Techniques are described for processing a query to produce query results, the query specifying at least a first timestamp value. Embodiments receive the query for processing and access a database index containing a plurality of database keys. The database index contains one or more database index keys, each of which includes at least a timestamp value and a time zone value. Embodiments compare the first timestamp value specified in the query with a portion of one the database index keys to locate at least a portion of the query results. More specifically, the compared portion of the database index key excludes the time zone value. The located portion of the query results is then retrieved.

21 Claims, 5 Drawing Sheets

# US 8,903,814 B2

INDEXING TIMESTAMP WITH TIME ZONE VALUE

BACKGROUND

Embodiments presented in this disclosure generally relate to database indexes and, more particularly, to techniques for indexing keys containing timestamp data and time zone data.

Databases are computerized information storage and retrieval systems. A relational database management system is a computer database management system ("DBMS") that uses relational techniques for storing and retrieving data. An object-oriented programming database is a database that is congruent with the data defined in object classes and subclasses. Regardless of the particular architecture, a requesting entity (e.g., an application or the operating system) in a DBMS requests access to a specified database by issuing a database access request. Such requests may include, for instance, simple catalog lookup requests or transactions and combinations of transactions that operate to read, change and add specified records in the database. These requests (i.e., queries) are often made using high-level query languages such as the Structured Query Language ("SQL"). Upon receiving such a request, the DBMS may execute the request against a corresponding database, and return any result of the execution to the requesting entity.

Information is typically retrieved from a database using database queries. A query usually specifies conditions that apply to one or more columns of the database and may specify logical operations to be performed that involve multiple columns. In processing such a query, the DBMS generally searches the database for records that satisfy the conditions specified by the query and returns those records as query results for the query. One way to improve the performance of a query is to use a database index. A database index is generally a data structure that allows data in the database (e.g., in a table) to be located and accessed more efficiently. A query optimizer within the DBMS may evaluate a query and determine that building an index for a table will help the query run faster. The query optimizer could then generate the index, which could be used in both the processing of the current query and in processing subsequent queries against the table as well.

SUMMARY

Embodiments of the invention provide a method, computer program product and system for processing a query that specifies at least a first timestamp value to produce query results. The method, computer program product and system include accessing a database index containing a plurality of database index keys. A second one of the database index keys in the database index includes at least a second timestamp value and a second time zone value. Additionally, the method, computer program product and system include comparing the first timestamp value specified in the query with a portion of the second database index key that excludes the second time zone value to locate the query results. The method, computer program product and system also include retrieving the located query results.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
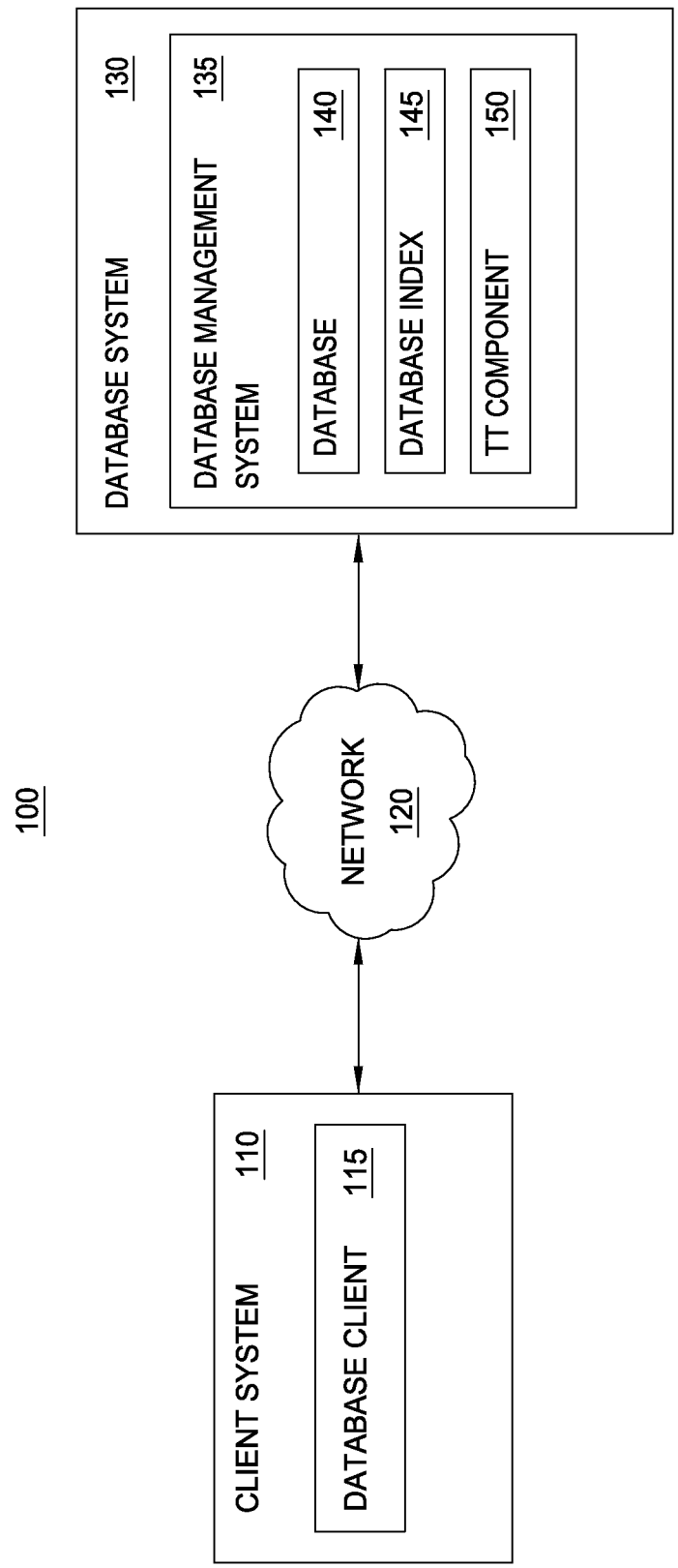
FIG. 1 is a block diagram illustrating a system configured to run a timestamp with time zone ("TT") component, according to one embodiment presented in this disclosure.

One type of data that databases often store is time-related data. Such time-related data can be stored in a wide variety of different formats. For instance, a particular database could store time-related data by storing a local time value and a time zone value. Doing so allows applications using the database to not only determine the local time associated with the data but also to derive the corresponding universal time for the data. As an example, consider two timestamps: 2010-04-11-12.34.56-07:00 and 2010-04-11-15.34.56-04:00. Accordingly, a database could store these timestamps as (20100411193456, -700) and (20100411193456, -400), respectively. Here, although the timestamps specify different local times and different time zones, both represent the timestamp 2010-04-11-19.34.56 in UTC. In other words, although many of the values in the timestamps differ from one another, the two timestamps represent the same moment in time.

One challenge for a database management system ("DBMS") is indexing such time-related data. Typically, index comparisons are optimized to compare one composite key with another by treating each of the keys as a single concatenated value. However, such a technique may produce incorrect results when time-related data is included in the index keys. For instance, if the DBMS were to index the timestamps as they are stored in the above example (i.e., as (20100411193456, -700) and (20100411193456, -400)), in performing an index comparison for the two timestamps, the DBMS would compare the concatenated strings 20100411193456-700 and 20100411193456-400 and determine that these strings are not the same. That is, the DBMS would determine the two timestamps are different from one another, even though the two timestamps represent the same moment in time.

Another technique for indexing such time-related data is to strip the time zone data from the timestamps and to index only a UTC-adjusted time value. Thus, in the above example, a DBMS using this technique would index the two timestamps as 20100411193456 and 20100411193456. Accordingly, index comparisons between the two timestamps would conclude that the timestamps are the same (i.e., the comparisons would correctly determine that the timestamps represent the same moment in time). However, one disadvantage to such a technique is that the index cannot be used for index-only access for the time-related data. Generally, a DBMS may use index-only access to retrieve query results for a particular query, when all or a portion of the query results are entirely contained within a database index. As such, when the time zone data is stripped from the index keys, the DBMS will not be able to use index-only access to process queries requesting the time zone data, as such data would not be contained in the database index.

As such, embodiments of the present invention provide techniques for processing a query to produce query results, the query specifying at least a timestamp value. Embodiments receive the query for processing and access a database index containing a plurality of database keys. Additionally, the database index contains at least one database key which includes a first timestamp value and a time zone value. Embodiments compare the timestamp value specified in the query with a portion of the database key that includes the first timestamp value but excludes the time zone value, in order to locate query results for the query. The located portion of the query results is then retrieved. The retrieved portion of query results may then be returned to the requesting entity from which the query was received, either alone or together with other query result data. Advantageously, embodiments enable index key comparisons on keys that include for timestamp data, while further enabling efficient techniques such as index-only access for time-related data in the database index.

FIG. 1 is a block diagram illustrating a system configured to run a timestamp with time zone ("TT") component, according to one embodiment presented in this disclosure. As shown, the system 100 includes a client system 110 and a database system 130, communicatively connected via a network 120. The client system includes a database client 115. Generally, the database client 115 represents any software application capable of submitting a database query to a DBMS 135. For instance, the database client 115 could be a software application configured to allow users to generate and submit database queries. As another example, the database client 115 could be a software application configured to submit one or more predefined database queries to the DBMS 135.

The DBMS 135 contains a database 140, database index 145 and timestamp with time zone ("TT") component 150. The database 140 is a data store capable of containing a plurality of records (i.e., data) and is managed by the DBMS 135. The database index 145 is generally a data structure used to ensure rapid lookups and accesses of records in the database 140. The TT component 150 generally is configured to manage the indexing of timestamp with time zone entries in the database index 145. That is, the TT component 150 is configured to manage a database index having keys that contain both timestamp data and time zone data. For instance, the TT component 150 could be configured to receive a query specifying a timestamp value and compare the specified timestamp value with portions of keys in the database index in order to locate query results for the query. More specifically, the TT component 150 could compare the specified timestamp value with portions of the database index keys that include the timestamp data but exclude the time zone data. Advantageously, by doing so, the TT component 150 may ensure that database key comparisons are performed accurately for keys that include time-related data.

Figure 2A:
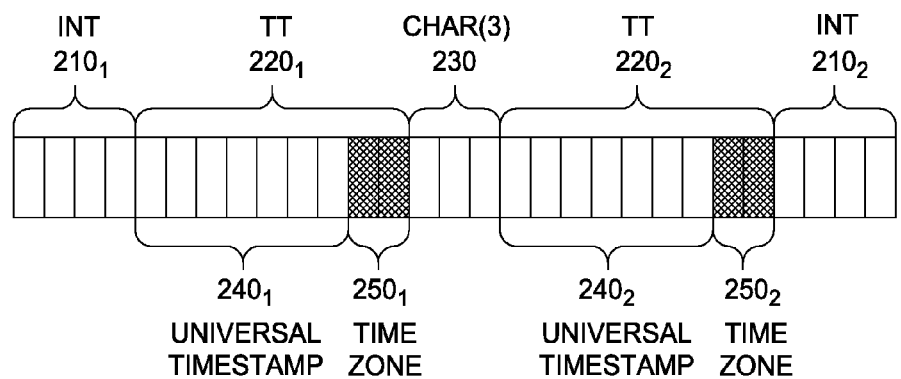
FIGS. 2A-2B are diagrams illustrating database index keys, according to one embodiment presented in this disclosure.
Figure 2B:
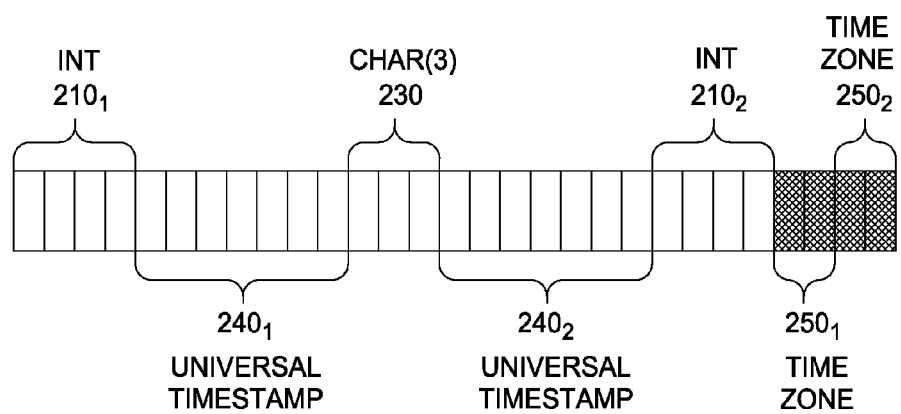

In managing time-related keys in the database index 145, the TT component 150 could employ a variety of different formats for the database index keys. Examples of two such formats are shown in FIGS. 2A-2B, which are diagrams illustrating database index keys, according to one embodiment presented in this disclosure. As shown in FIG. 2A, the database index key 200 contains a plurality of data values, including an INT $210_1$, a TIMESTAMP WITH TIME ZONE ("TT") $220_1$, a CHAR(3) 230, a second TT $220_2$ and a second INT $210_2$. Additionally, the TT values $220_{1,\,2}$ contain a universal timestamp $240_{1,\,2}$ ("UT") and a time zone value $250_{1,\,2}$, respectively.

When performing database index key comparisons for the key 200, the TT component 150 could initially identify the time zone values $250_{1,\,2}$ within the key. Thus, in the depicted example, the TT component 150 could identify the TT values $220_{1,\,2}$ and then identify the last two characters in each of the identified TT values $220_{1,\,2}$. Upon identifying the time zone data, the TT component 150 could concatenate the remaining portions (i.e., the non-shaded portions of the key 200) of the key 200 into a single data object and perform the database key comparison using the single data object. Advantageously, doing so enables the TT component 150 to perform key comparisons for the key 200 without interference from the time zone data, while keeping the time zone values $250_{1,\,2}$ in the key 200 so that index-only access may be used.

Consider the example discussed above, where a database stores TT data as (20100411193456, -700) and (20100411193456, -400). Although these TT values specify different local times and different time zones, both represent the timestamp 2010-04-11-19.34.56 in universal time. Put another way, although many of the values in the timestamps differ from one another, the two timestamps represent the same moment in time. However, if these values were indexed in a typical database indexing fashion, the DBMS could concatenate the timestamp and the time zone values together to produce the keys 20100411193456-700 and 20100411193456-400. However, as these keys are clearly different from one another because of the time zone data, a database index key comparison between these two keys would determine that the keys are different, even though the keys represent the same moment in time.

Using the method described above, the TT component 150 could still index the keys as 20100411193456-700 and 20100411193456-400, but in performing a database key comparison involving the keys, may not combine all the key components and do one comparison per key, as is a typical optimization for a database index search. Rather, the TT component 150 may perform the comparison on select components within the key, component by component. That is, the TT component 150 could perform key comparisons on the timestamp values within the keys, while ignoring the time zone portions of the keys. Thus, the TT component 150 would perform the key comparison on the values 20100411193456 and 20100411193456 and correctly determine that these keys are the same. However, as the time zone data of -700 and -400 is still included in the index keys, the database index may still facilitate index-only access for the TT data. One advantage to the database index key format shown in FIG. 2A is that the database index will be relatively inexpensive (i.e., in terms of computing resources) to maintain, as there are no modifications made to the timestamp with time zone data. To reduce the number of comparisons per key, the TT component 150 could divide the key into three groups by the time zone components and could perform the key comparison group by group. For instance, a first group could contain INT $210_1$ and UT $240_1$, the second group could contain CHAR 320 and UT $240_2$, and the third group could contain INT $210_2$. Advantageously, doing so enables the TT component 150 to compare database index keys containing time zone data and minimizes the number of comparisons involved in each key comparison (i.e., 3 in the present example, as opposed to 5).

FIG. 2B shows a second example of a database index key, according to one embodiment presented in this disclosure. As shown, the key 260 includes the same plurality of data values as in the key 200, but with a different arrangement of the data values. The key 260 includes the INT $210_1$, the time stamp $240_1$, the CHAR(3) 230, the second time stamp $240_2$, the second INT $210_2$, the time zone $250_1$ and the time zone $250_2$. Generally, when performing key comparisons on the key 260, the TT component 150 may use a portion of the key 260 in the comparison, the portion excluding the time zone data $250_{1, 2}$. One advantage to the format shown in the key 260 is that no concatenation of the remaining portions of the key 260 (i.e., the portions that exclude the time zone data) is needed. That is, upon determining that a set of database index keys use the format shown in the key 260, the TT component 150 could be configured to exclude the last 4 characters of the keys (i.e., the shaded portion of the key containing the time zone data $250_{1, 2}$) from key comparisons. Such a configuration may produce more efficient database key comparisons, as no concatenation operation on the portions of the keys needs to be performed. While the keys 200 and 260 illustrate two exemplary database index key formats that could be used in accordance with embodiments of the invention, such examples are provided for illustrative purposes only and without limitation. Moreover, it is broadly contemplated that any database index key format consistent with the functions described herein may be used.

Figure 3:
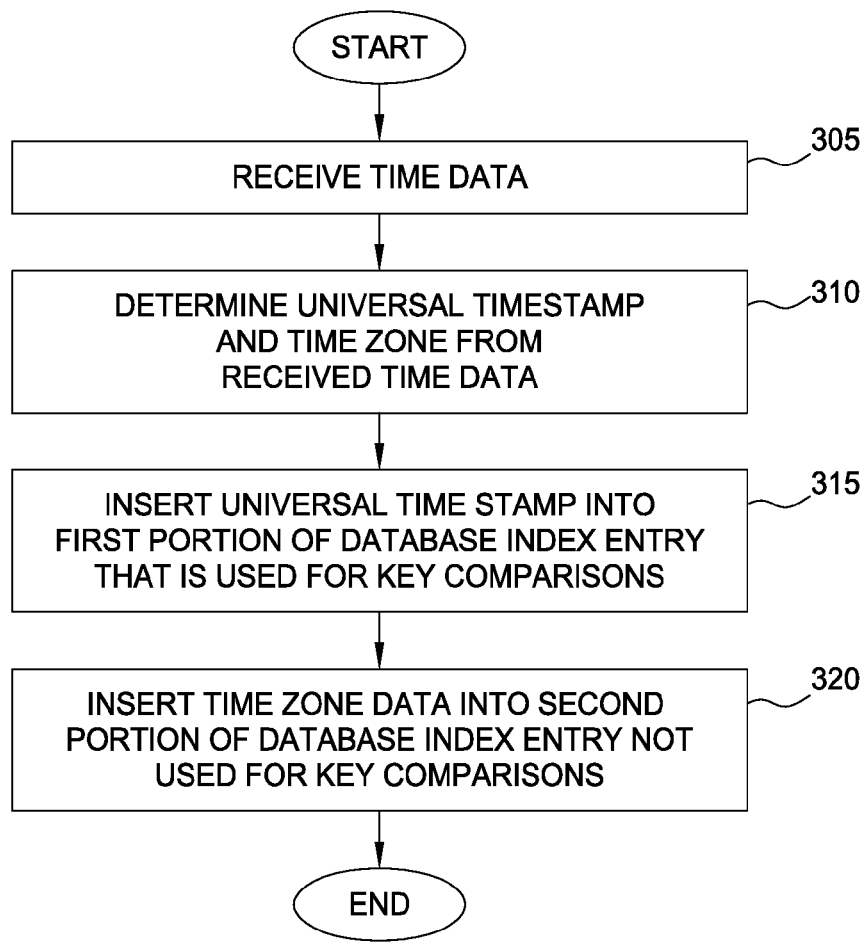
FIG. 3 is a flow diagram illustrating a method for creating a database index key, according to one embodiment presented in this disclosure.

FIG. 3 is a flow diagram illustrating a method for creating a database index key, according to one embodiment presented in this disclosure. As shown, the method 300 begins at step 305, where the TT component 105 receives a database query specifying timestamp data. In one embodiment, the query specifies both a timestamp and a time zone in which the timestamp was recorded. The timestamp may be expressed in local time or universal time. Upon receiving the query, the TT component 150 determines a universal timestamp and a time zone from the received query (step 310). In an embodiment where the query specifies a timestamp expressed in local time, the TT component 150 may convert the timestamp to universal time based on time zone data. Such time zone data may be explicitly specified in the query or may be implicitly determined by the TT component 150 (e.g., the TT component 150 could be preconfigured to apply a default time zone).

The TT component 150 then inserts the universal timestamp into a portion of a database index key that is used in key comparisons (step 315). Likewise, the TT component 150 inserts the time zone data into a second portion of the database index key, the second portion being a portion of the database index key that is not used in key comparisons (step 320). That is, the TT component 150 may be configured to exclude certain portions of database index keys from key comparisons (e.g., the shaded areas shown in FIGS. 2A and 2B). When creating a new database index key, the TT component 150 could insert the time zone data into these excluded portions, so that the time zone data will not be considered in database index key comparisons. Advantageously, doing so allows for database index comparisons to correctly handle the time-related data. Furthermore, by including the time zone data in the database index, the method 300 ensures that index-only access will be available for the time-related data in the database index. Once the database index key is created, the method 300 ends.

Figure 4:
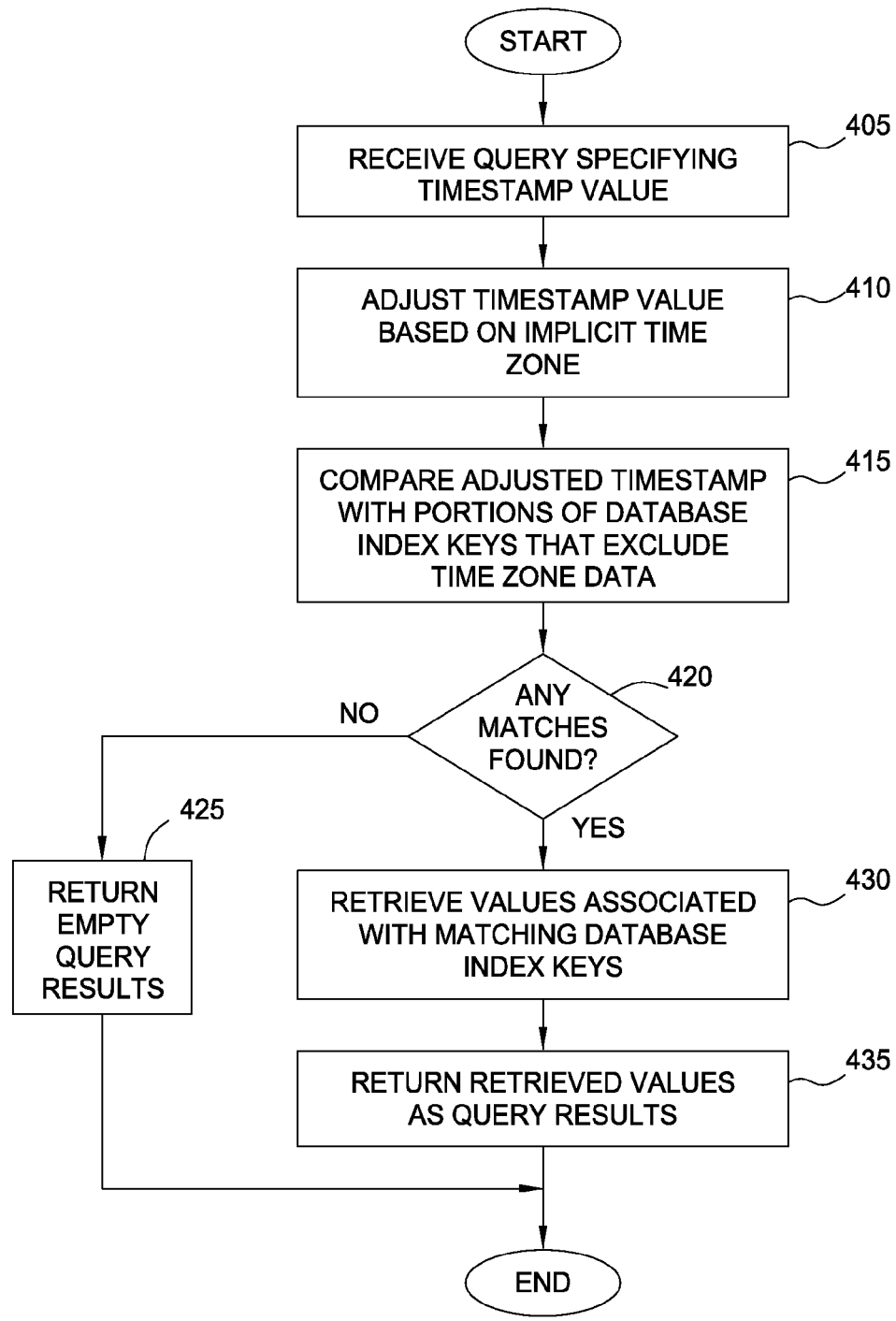
FIG. 4 is a flow diagram illustrating a method for processing a query, according to one embodiment presented in this disclosure.

FIG. 4 is a flow diagram illustrating a method for processing a query, according to one embodiment presented in this disclosure. As shown, the method 400 begins at step 405, where the TT component 150 receives a query from a requesting entity, the query specifying a timestamp value expressed in local time. As discussed above, in particular embodiments, the TT component 150 may receive queries that specify both a timestamp value and a time zone value. The example depicted in FIG. 4, however, illustrates an embodiment where the query contains only timestamp data. Upon receiving the query, the TT component 150 adjusts the received timestamp value based on an implicit time zone (step 410). In one embodiment, the TT component 150 is configured to adjust all local timestamps where no explicit time zone is specified by a default time zone offset. In another embodiment, when no explicit time zone is specified, the TT component 150 is configured to adjust the local timestamp by a time zone offset associated with the entity from which the query was received.

Once the received timestamp is adjusted based on the implicit time zone value, the TT component 150 compares the adjusted timestamp with portions of one or more database index keys (step 415). Here, although the database index keys contain both timestamp and time zone data, the TT component 150 is configured to compare the received timestamp with a portion of the database index keys that contain the timestamp data and exclude the time zone data. In an embodiment where the database index keys contain timestamp data expressed in universal time, the TT component 150 may directly compare the timestamp data in the keys with the received timestamp. In other embodiments, the database index keys contain timestamp data expressed in local time. In such embodiments, the TT component 150 may be configured to convert the local timestamp data in the index keys to universal time based on the time zone data contained in each of the respective keys, before comparing the timestamp data in the keys to the received timestamp data.

At step 420, the TT component 150 determines whether any matches were found between the timestamp specified in the received query and the database index keys. If the TT component 150 determines no matches were found, the TT component 150 returns an empty set of query results to the requesting entity from which the query was received. If instead the TT component 150 determines that at least one match was found, the TT component 150 retrieves values associated with the matching database index keys (step 430) and returns the retrieved values as query results for the query to the requesting entity (step 435). Once the empty query results or the query results containing the retrieved values are returned, the method 400 ends.

Figure 5:
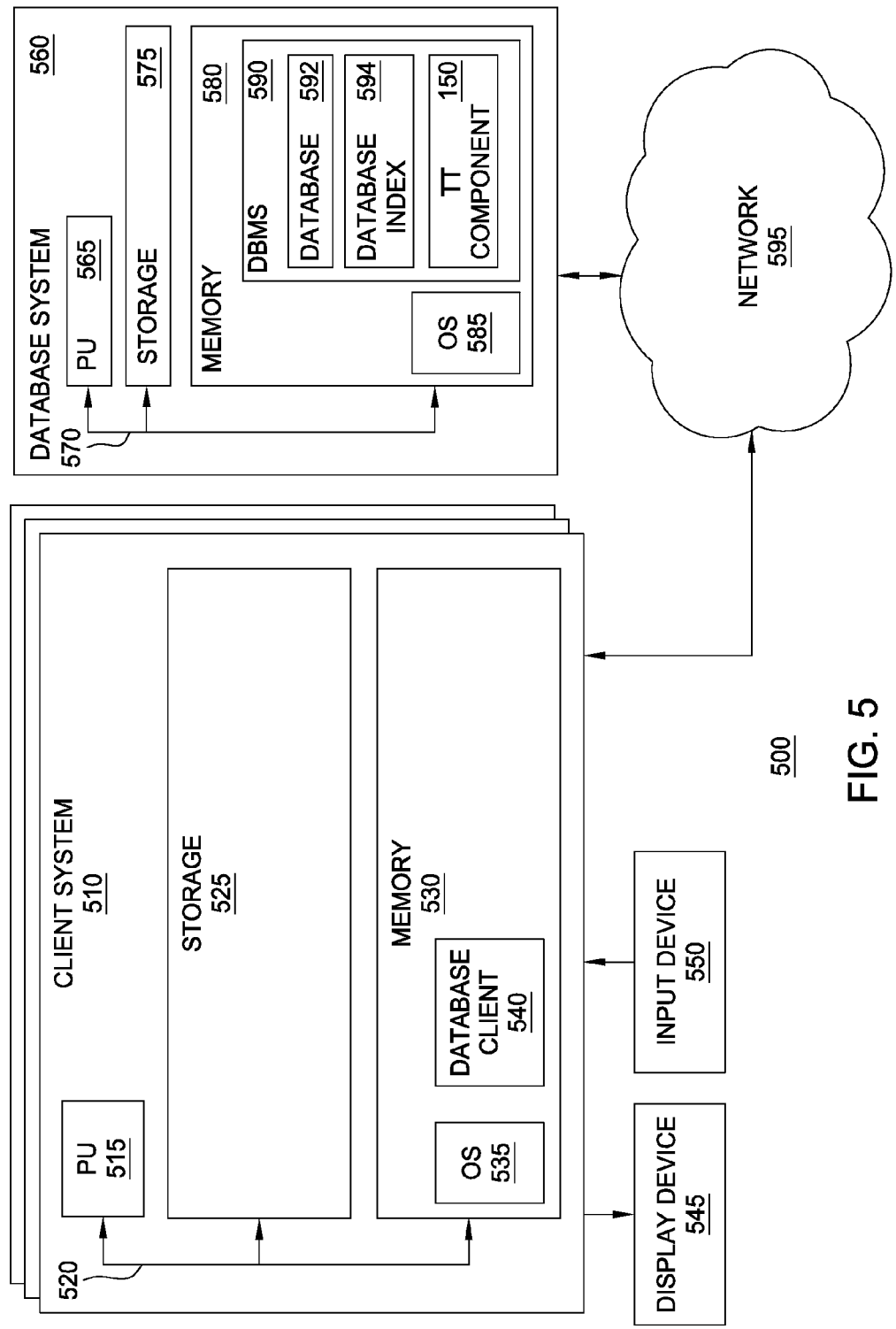
FIG. 5 is a block diagram illustrating a system configured to run a TT component, according to one embodiment presented in this disclosure.

FIG. 5 is a block diagram illustrating a system configured to run a TT component, according to one embodiment presented in this disclosure. As shown, the system 500 includes a plurality of client systems 510 and a database system 560, communicatively coupled via a network 595. In one embodiment, the client systems 510 may include existing computer systems, e.g., desktop computers, server computers, laptop computers, tablet computers, mobile devices (e.g., mobile phones), gaming consoles, hand-held gaming devices and the like. The client systems 510 illustrated in FIG. 5, however, are merely examples of computer systems in which embodiments of the present invention may be used. Embodiments of the present invention may be implemented differently, regardless of whether the computer systems are complex multi-user computing systems, such as a cluster of individual computers connected by a high-speed network, single-user workstations, or network appliances lacking non-volatile storage. Moreover, it is explicitly contemplated that embodiments of the invention may be implemented using any device or computer system capable of performing the functions described herein.

As shown, each client system 510 includes, without limitation, a processor 515, which obtains instructions and data via a bus 520 from a memory 530 and storage 525. Processor 515 is a programmable logic device that performs instruction, logic, and mathematical processing, and may be representative of one or more CPUs. Storage 525 is representative of hard-disk drives, flash memory devices, optical media and the like. Generally, the storage 525 stores application programs and data for use by the client system 510. The client systems 510 are operably connected to the network 595, e.g., via network interfaces.

The memory 530 is any memory sufficiently large to hold the necessary programs and data structures. Memory 530 could be one or a combination of memory devices, including Random Access Memory, nonvolatile or backup memory (e.g., programmable or Flash memories, read-only memories, etc.). In addition, memory 530 and storage 525 may be considered to include memory physically located elsewhere; for example, on another computer coupled to the client system 510 via bus 520. The memory 530 includes a database client 540 and an operating system ("OS") 535. Operating system 535 is software used for managing the operation of the client system 510. Examples of OS 535 include UNIX, versions of the Microsoft Windows® operating system and distributions of the Linux® operating system. (Note: Linux is a trademark of Linus Torvalds in the United States and other countries.) More generally, any operating system 535 capable of performing the functions described herein may be used.

Additionally, the client systems 510 are each coupled to display devices 545 and input devices 550. The display devices 545 may include output devices such as monitors, touch screen displays, and so on. For instance, the display devices 545 may include a display device used to visually depict a user interface through which a user may form database queries to submit to the DBMS 590. The input devices 550 represent a wide variety of input devices, including keyboards, mice, controllers, microphones, and so on.

As shown, the database system 560 includes, without limitation, a processor 565, which obtains instructions and data via a bus 570 from a memory 580 and storage 575. Processor 565 is a programmable logic device that performs instruction, logic, and mathematical processing, and may be representative of one or more CPUs. Storage 575 is representative of hard-disk drives, flash memory devices, optical media and the like. Generally, the storage 575 stores application programs and data for use by the database system 560. The database system 560 is operably connected to the network 595, e.g., via a network interface.

The memory 580 is any memory sufficiently large to hold the necessary programs and data structures. Memory 580 could be one or a combination of memory devices, including Random Access Memory, nonvolatile or backup memory (e.g., programmable or Flash memories, read-only memories, etc.). In addition, memory 580 and storage 575 may be considered to include memory physically located elsewhere; for example, on another computer coupled to the database system 560 via bus 570. The memory 580 includes a DBMS 590 and an OS 585. Operating system 585 is software used for managing the operation of the database system 560. Examples of OS 585 include UNIX, versions of the Microsoft Windows® operating system and distributions of the Linux® operating system. More generally, any operating system 585 capable of performing the functions described herein may be used.

As shown, the DBMS 590 contains a database 592, a database index 594 and a TT component 150. The database index 594 is generally a data structure used to ensure rapid lookups and efficient access of records in the database 592. Furthermore, although the database 592 is shown as contained entirely in memory 580, such a depiction is for illustrative purposes only. Moreover, one of ordinary skill in the art will recognize that the database 592 could be contained not only in memory 580 but in a variety of locations, including, for example, storage 575, another storage device altogether (e.g., a remote storage device via bus 570), or a mix thereof.

As discussed above, the TT component 150 generally manages timestamp with time zone data in the database index 594. For instance, the TT component 150 could add an entry (i.e., a key) to the database index 594 that contains timestamp and time zone data. In doing so, the TT component 150 could insert the time zone data into a portion of the entry that will be excluded from database index key comparisons. In one embodiment, the excluded portion of the database key is predefined. For example, for a database key containing only one set of timestamp and time zone data, the last two characters of the key could be reserved for storing the time zone data. When performing subsequent database key comparisons, the TT component 150 could then compare only the portion of the newly-added database key that does not contain the time zone data. Advantageously, this enables key comparisons to be performed for the database index 594 that for time values, while still enabling index-only access operations for time-related data in the database index 594.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user could submit a database query (e.g., using the database client 540) specifying a timestamp value and requesting query results from a database or related data available in the cloud. For example, a DBMS configured with a TT component 150 could execute on a computing system in the cloud and maintain a database index having at least one key specifying a timestamp value and a time zone value. Upon receiving a database query specifying one or more timestamp values, the TT component 150 could perform database index key comparisons between the timestamp value specified in a received query and a portion of the database index key, where the portion includes a first timestamp value but excludes the time zone value. Doing so allows users to submit queries specifying timestamp values from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for processing a query specifying at least a first value and a second value to produce query results, comprising:
   accessing a database index to determine a location where query result data is stored, comprising:
      upon determining that the first value specified in the query is a timestamp value, accessing the database index containing a plurality of database index keys to determine the location of query result data using a partial key comparison between the first value and a first one or more of the plurality of database index keys, wherein each of the first one or more database index keys includes at least a respective first timestamp value and a respective first time zone value, comprising:
         comparing the first value specified in the query with a portion of one of the first one or more database index keys to determine that the first value and the portion of the database index key are equivalent, wherein the compared portion of the first database index key excludes the first time zone value; and
         accessing location information data within the first database index key to determine the location of the query result data;
      upon determining that the second value specified in the query is not a timestamp value, accessing the database index to determine the location of the query result data using a full key comparison between the second value and a second one or more of the plurality of database index keys that are not timestamp values, such that the second value specified in the query is compared with the entirety of at least one of the second one or more database index keys;
   and
   retrieving the query result data using the determined location.

2. The method of claim 1, further comprising:
   receiving a request specifying a separate timestamp value and a separate time zone value to insert into the database index;
   generating a database index key, wherein the separate timestamp value is contained in a first portion of the generated database index key, and the separate time zone value is contained in a second portion of the generated database index key; and
   inserting the generated database index key into the database index.

3. The method of claim 2, wherein the second portion of the generated database index key is predefined as a portion of the generated database index key to be excluded from database index key comparisons.

4. The method of claim 1, further comprising:
   receiving the query from a requesting entity; and
   upon retrieving the query result data, returning the query result data to the requesting entity.

5. The method of claim 1, further comprising:
   converting the first value specified in the query to universal time, based on a predefined implicit time zone value.

6. The method of claim 1, wherein the first timestamp value is specified in local time, and further comprising:
   converting the first timestamp value to universal time, based on the first time zone value,
   wherein the converted first timestamp value is compared with the first value specified in the query to locate the query results.

7. The method of claim 1, wherein the first timestamp value is expressed in universal time.

8. A computer program product for processing a query specifying at least a first value and a second value to produce query results, comprising:
   a computer-readable storage memory having computer readable program code embodied therewith, the computer readable program code comprising:
      computer readable program code to access a database index to determine a location where query result data is stored, comprising:
         computer readable program code to, upon determining that the first value specified in the query is a timestamp value, access the database index containing a plurality of database index keys to determine the location of query result data using a partial key comparison between the first value and a first one or more of the plurality of database index keys, wherein each of the first one or more database index keys includes at least a respective first timestamp value and a respective first time zone value, comprising:
            computer readable program code to compare the first value specified in the query with a portion of one of the first one or more database index keys to determine that the first value and the portion of the database index key are equivalent, wherein the compared portion of the first database index key excludes the first time zone value; and
            computer readable program code to access location information data within the first database index key to determine the location of the query result data;
         computer readable program code to, upon determining that the second value specified in the query is not a timestamp value, accessing the database index to determine the location of the query result data using a full key comparison between the second value and a second one or more of the plurality of database index keys that are not timestamp values, such that the second value specified in the query is compared with the entirety of at least one of the second one or more database index keys; and
      computer readable program code to retrieve the query result data using the determined location.

9. The computer program product of claim 8, further comprising:
   computer readable program code to receive a request specifying a separate timestamp value and a separate time zone value to insert into the database index;
   computer readable program code to generate a database index key, wherein the separate timestamp value is contained in a first portion of the generated database index key, and the separate time zone value is contained in a second portion of the generated database index key; and
   computer readable program code to insert the generated database index key into the database index.

10. The computer program product of claim 9, wherein the second portion of the generated database index key is predefined as a portion of the generated database index key to be excluded from database index key comparisons.

11. The computer program product of claim 8, further comprising:
   computer readable program code to receive the query from a requesting entity; and computer readable program code to, upon retrieving the query result data, return the query result data to the requesting entity.

12. The computer program product of claim 8, further comprising:
computer readable program code to convert the first value specified in the query to universal time, based on a predefined implicit time zone value.

13. The computer program product of claim 8, wherein the first timestamp value is specified in local time, and further comprising:
computer readable program code to convert the first timestamp value to universal time, based on the first time zone value,
wherein the converted first timestamp value is compared with the first value specified in the query to locate the query results.

14. The computer program product of claim 8, wherein the first timestamp value is expressed in universal time.

15. A system, comprising:
a processor; and
a memory containing a program that, when executed by the processor, performs an operation for processing a query specifying at least a first value and a second value to produce query results, comprising:
accessing a database index to determine a location where query result data is stored, comprising:
upon determining that the first value specified in the query is a timestamp value, accessing the database index containing a plurality of database index keys to determine the location of query result data using a partial key comparison between the first value and a first one or more of the plurality of database index keys, wherein each of the first one or more database index keys includes at least a respective first timestamp value and a respective first time zone value, comprising:
comparing the first value specified in the query with a portion of one of the first one or more database index keys to determine that the first value and the portion of the database index key are equivalent, wherein the compared portion of the first database index key excludes the first time zone value; and
accessing location information data within the first database index key to determine the location of the query result data;
upon determining that the second value specified in the query is not a timestamp value, accessing the database index to determine the location of the query result data using a full key comparison between the second value and a second one or more of the plurality of database index keys that are not timestamp values, such that the second value specified in the query is compared with the entirety of at least one of the second one or more database index keys;
and
retrieving the query result data using the determined location.

16. The system of claim 15, the operation further comprising:
receiving a request specifying a separate timestamp value and a separate time zone value to insert into the database index;
generating a database index key, wherein the separate timestamp value is contained in a first portion of the generated database index key, and the separate time zone value is contained in a second portion of the generated database index key; and
inserting the generated database index key into the database index.

17. The system of claim 16, wherein the second portion of the generated database index key is predefined as a portion of the generated database index key to be excluded from database index key comparisons.

18. The system of claim 15, the operation further comprising:
receiving the query from a requesting entity; and
upon retrieving the query result data, returning the query result data to the requesting entity.

19. The system of claim 15, the operation further comprising:
converting the first value specified in the query to universal time, based on a predefined implicit time zone value.

20. The system of claim 15, wherein the first timestamp value is specified in local time, and the operation further comprising:
converting the first timestamp value to universal time, based on the first time zone value,
wherein the converted first timestamp value is compared with the first value specified in the query to locate the query results.

21. The system of claim 15, wherein the first timestamp value is expressed in universal time.

* * * * *